April 11, 1944.  W. MANNING  2,346,595
PROPELLING MEANS
Filed June 27, 1942  2 Sheets-Sheet 1

WITNESSES

INVENTOR
William Manning
BY
ATTORNEYS

April 11, 1944. W. MANNING 2,346,595
PROPELLING MEANS
Filed June 27, 1942 2 Sheets-Sheet 2
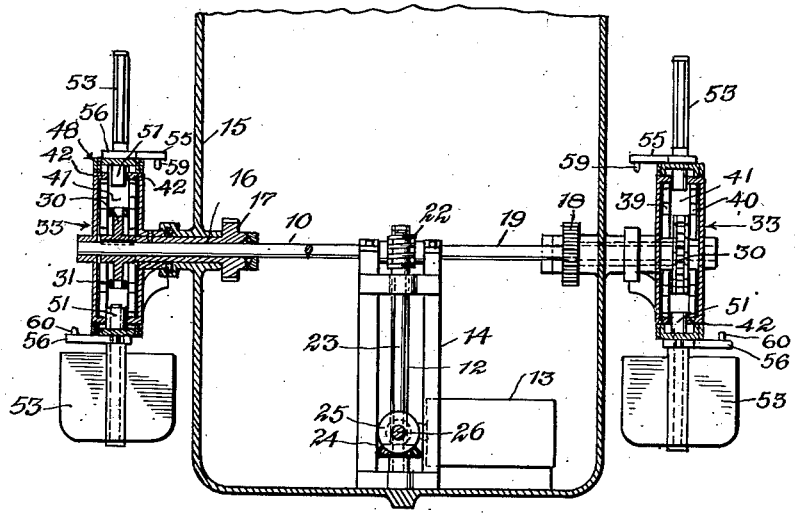
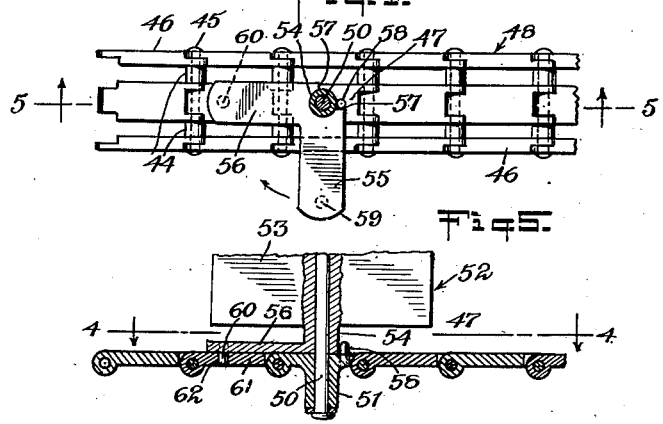
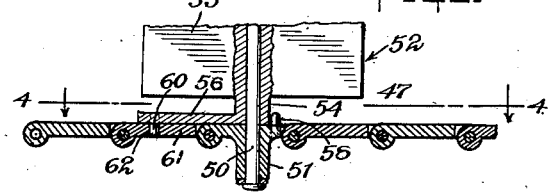
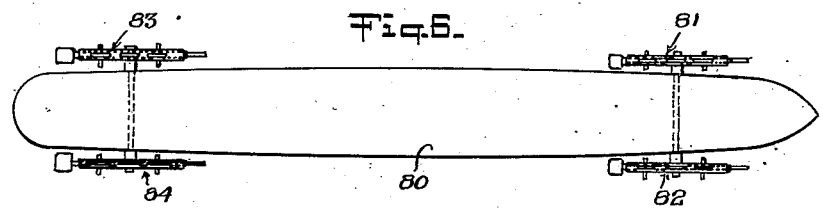
WITNESSES
INVENTOR
William Manning
BY
ATTORNEYS Patented Apr. 11, 1944

2,346,595

UNITED STATES PATENT OFFICE 2,346,595

PROPELLING MEANS

William Manning, New York, N. Y.

Application June 27, 1942, Serial No. 448,779

9 Claims. (Cl. 170—138)

This invention relates to propelling means, and more particularly to a structure wherein the means of propulsion are most advantageously positioned to give the greatest friction during the period in which they are transmitting power, and in which said propelling means are positioned to avoid friction or loss of power during the period in which they are not transmitting power.

While the principles of my invention may be applied either as a prime mover or a generator, and may likewise be used on water, land, or in the air, for the purposes of illustration I have shown my invention as applied to a paddle wheel construction. It may be used to power a boat or to take power from a running stream or the tides.

An object of the invention is to provide a propelling means which is so mounted that its angles of contact may be changed to secure the maximum efficiency from the power source.

In the accompanying drawings:—

Fig. 3 is a cross sectional view taken on the line 3—3 of Fig. 2;

Fig. 4 is a detail view showing the paddle mounting taken on the line 4—4 of Fig. 5;

Fig. 5 is a cross sectional view taken on the line 5—5 of Fig. 4; and

Fig. 6 is a plan view showing an adaptation of my invention on a boat.

Figure 1:
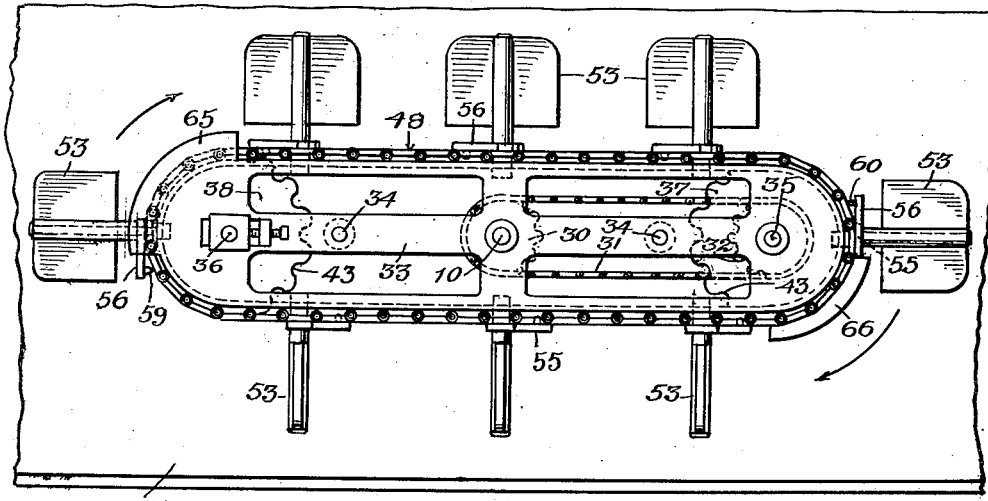
Fig. 1 is a side elevation of an adaptation of my invention.
Figure 2:
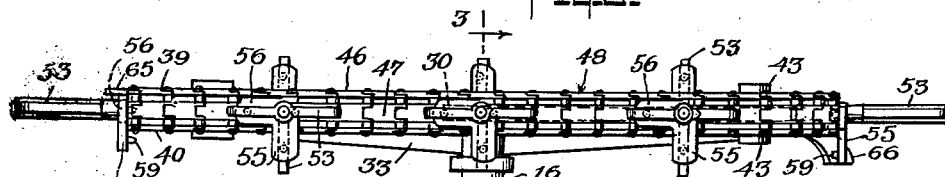
Fig. 2 is a plan view thereof.
Figure 2:
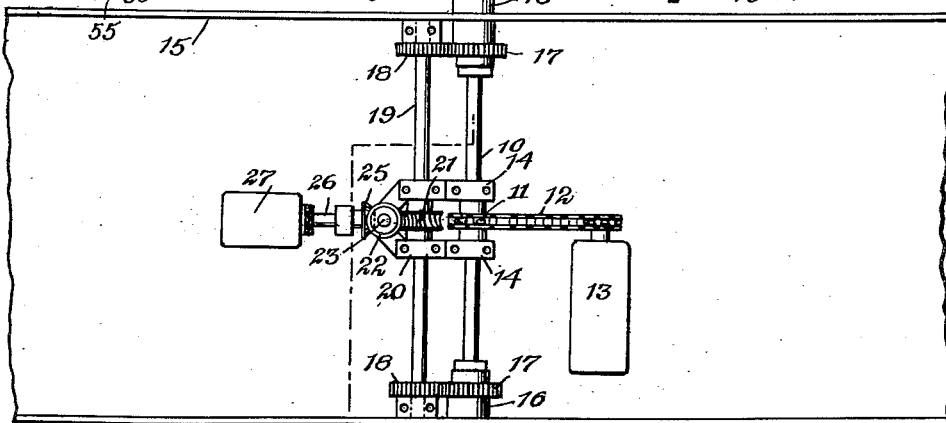
Figure 2:
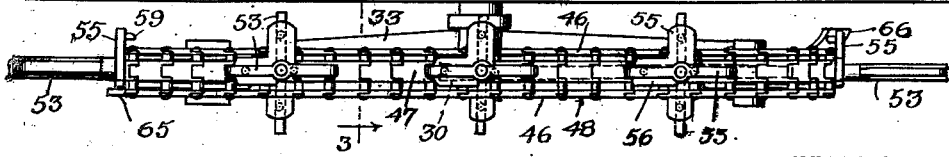

In the accompanying drawings my propelling means are mounted on a central shaft 10 which is provided with a sprocket 11 engaging a chain 12 driven by the motor 13. The shaft 10 is mounted on the framework 14 in a suitable manner, and where used in a boat, extends through the hull 15 and bushings or other suitable bearings 16. The shaft 10 is adapted to rotate within the bushings 16 for the purpose which will be hereinafter described.

The bushings 16 extend through the hull 15 and engage the frame 33. Mounted on the inner portion of the bushings 16 are cogs 17 engaging similar cogs 18 mounted on the shaft 19 which, in turn, is mounted on the frame 14. In the center of the shaft 19 is a gear 21 which engages a worm 22 on the vertical shaft 23. On the lower portion of the shaft 23 is a beveled gear 24 engaging a beveled gear 25 on the shaft 26 powered by the motor 27. It will be seen that the motor 27 is adapted to rotate the bushings 16 and with them, frame 33.

Mounted on the outer end of the shaft 10, at either side, is a sprocket 30 which engages the chain 31 running to the sprocket 32. The shaft 10 extends through the frame 33 which is preferably of double construction, held in position by the spacing blocks 34. At the end of the frame 33 is a shaft 35 upon which the sprocket 32 is mounted. Also mounted on the shaft 35 and on a corresponding shaft 36 at the other end of the frame, are the larger sprockets 37 and 38. The sprockets 37 and 38 are of double construction consisting of the members 39 and 40 having a channel 41 therebetween. The riding surfaces 43 of the sprockets 37 and 38 are adapted to engage the rollers 44 on the pins 45 which, with the links 46 and the central carrying links 47, make up the chain 48, as clearly shown in Fig. 4. The frame 33 is provided at either side with flanges 42 which act as guides to the depending boss 51, hereafter discussed.

At spaced intervals on the central carrying links 47 are mounted the spindles 50 which extend through depending bosses 51. On the spindles 50 are mounted the paddle assemblies 52 comprising the paddle 53 and shaft 54. At the lower portion of the shaft 54 are bending members 55 and 56 at right angles to each other, forming an elbow. The inner portion of the members 55 and 56 are provided with shoulders 57 adapted to engage the stop 58 on link 47 to limit the pivotal movement of the paddle assembly on the spindle 50. At the outer end of the member 55 is mounted a projecting pin 59, while at the outer end of the member 56, a similar pin 60 is mounted. The link 61 is provided with an aperture 62 adapted to be engaged by the pins 59 and 60, depending upon the position of the paddle assembly.

As the chain 48 is rotated on the sprockets 37 and 38, the paddle assembly is steadied by the riding surfaces of the sprocket 43, while the flanges 42 tend to guide the boss 51. The flanges 42 at each side of the frame 33 have their opposite ends spaced from the sprockets 37 and 38 to provide clearance and thus allow the riding surfaces of the sprockets to engage the rollers 44 of the chain 48. It will be appreciated that as long as chain 48 is extended flat, the position of the paddle assembly 54 will not be varied, since either the pin 59 or 60 will be engaged in the hole 61, while a corresponding shoulder will engage the stop 58. However, as the chain moves over the sprockets 37 and 38 it is no longer flat, and the pin 59 or 60, as the case may be, is released from the aperture 61 due to the curvature of the chain.

It will be noted that, in Fig. 1, the chain moves in a clockwise direction. Mounted at the upper left hand of the frame 33 is a cam 65 while a similar cam 66 is mounted on the lower right hand of the frame 33. It will be noted that, from the detailed illustration shown in Figs. 4 and 5, the paddle 53 is in the feathered position. In other words, it is parallel to the longitudinal axis of the chain.

As the paddle moves along the sprocket 37, and the chain bends to conform with the shape of the sprocket, pin 60 is released from the aperture 61, and the paddle assembly 52 is then free to pivot 90°, until the shoulder 57 engages the stop 58. This pivoting is caused by the cam 66 which engages the side of the arm 55 to cause it to pivot and thus place the paddle at right angles to the longitudinal axis of the chain.

As the chain moves over the sprocket, the pin 59 engages the aperture 61 and the paddle is fixed in the power position until the sprocket 38 is reached. As the chain starts to bend, the pin 59 is freed, and the cam 65 engages the arm 56 to rotate the paddle in feathered position. It will be appreciated that, if desired, pins 59 and 60 may be replaced by apertures, and a single pin placed on the chain instead of the aperture 62.

In Fig. 6, a boat 80 having four paddle drives 81, 82, 83 and 84, is indicated. In operation the individual paddle assemblies can be driven at different speeds to change the direction of the boat. In operation the motor 13 transmits rotary power to the shaft 10 which, in turn, through sprocket 30, chain 31 and sprocket 32, rotates shaft 35 and the sprocket 37, thus transmitting rotary movement to the chain 48 and to the paddles, in the manner described.

It will, of course, be appreciated that where the device is used as a generator, the motor power is reversed. In order to obtain the most advantageous angle of thrust, the motor 27 is used to control the angle of the frame 33. It will be appreciated that any desired angle may be secured if it is desirable to reverse the action of the paddles. The entire frame 33 may be turned through an arc of 180° so that the operating paddles are on the top, while the feathered paddles are on the bottom.

Because of my construction, the entire paddle assembly may be submerged in water or other medium without any loss of power, since the paddles which are not transmitting power are feathered and will not offer any resistance or excessive friction.

As has been previously pointed out, in order to more clearly define and describe by invention, I have shown it used in connection with a boat with water as the medium. However, it may be used on land or in the air without deviating from the spirit of the invention.

I claim:

1. A propelling mechanism including an elongated frame, an endless chain mounted on said frame for rotation thereon, means for rotating said chain, power elements mounted on said chain, and means for changing the position of said power elements on opposite sides of said frame whereby said power elements are upstanding on and parallel to said chain on one side of said frame and depending from and at right angles to said chain at the other side of said frame.

2. The combination with an endless flexible carrier of a mounting for an element thereon, said mounting including a pivot, an elbow member engaging said pivot, a stop on said carrier to limit the movement of said pivot, means on either end of said elbow member for engaging said carrier when said carrier is in a flat position, but adapted to be free from said carrier when said carrier is in arcuate position, and means adapted to engage said elbow member to pivot said mounting when said carrier is in an arcuate position.

3. In mechanism of the character described, a movable endless carrier, turnable power elements mounted on said carrier, a pair of arms for each power element disposed at an angle with respect to each other and each arm also being disposed radially with respect to the axis on which its power element turns, one arm being operable to turn the power element to an inactive position and the other arm being operable to turn the power element to an active position, and cooperative means on each arm and the carrier operable to retain the power element in the inactive position and the active position for a predetermined period of time in each position during the movement of the carrier and in response thereto, and said means also being disengageable to enable the turning of each power element in the manner aforesaid during the movement of the carrier and in response thereto.

4. In mechanism as set forth in claim 3, and means to limit the turning movement of each power element into the inactive position and the active position.

5. In mechanism as set forth in claim 3, wherein said cooperative means consists of a pin and an aperture to receive the pin.

6. In mechanism as set forth in claim 3, and means to limit the turning movement of each power element so that said cooperative means may function.

7. A propelling mechanism including an elongated frame, an endless carrier having apertured links mounted for movement on said frame to provide straight leads and arcuate portions, propelling elements each pivotally mounted on said carrier, said propelling elements each having at its base a pair of arms extending at right angles to each other, means on each of said arms adapted to engage an apertured link in each straight lead of the carrier but adapted to be disengaged from said link in each arcuate portion of said carrier, and cam means on said frame adapted to engage one of said arms of each propelling element to pivot said propelling element when said means on its other arm is disengaged as aforesaid.

8. A propelling mechanism including an elongated frame, an endless carrier mounted for movement on said frame to provide straight leads and arcuate portions, propelling elements each pivotally mounted on said carrier, said propelling elements each having at its base a pair of arms at right angles to each other, one of said arms extending longitudinally of said carrier while the other arm extends laterally with respect thereto, means on each of said arms which cooperates with means on said carrier to engage the latter when said arm extends longitudinally with respect to each straight lead of the carrier, but adapted to become disengaged to free said arm from each arcuate portion of the carrier in the movement of the carrier, and means on said frame adapted to engage one of said arms of each propelling element to pivot said propelling element when its other arm is free as aforesaid.

9. A propelling mechanism including an elongated frame, sprockets mounted at either end of said frame, an endless carrier mounted on said sprockets to provide straight leads and arcuate portions, paddle members each pivotally mounted on said carrier, each of said paddle members having a pair of arms extending at right angles to each other, means on each of said arms which cooperates with means on said carrier to engage the latter when said arm extends longitudinally with respect to each straight lead of the carrier, but adapted to become disengaged to free said arm from each arcuate portion of the carrier in the movement of the carrier, and cam means on said frame adapted to engage one of said arms of each paddle member to pivot said paddle member when its other arm is free as aforesaid.

WILLIAM MANNING.